Patented Aug. 21, 1951

2,565,402

UNITED STATES PATENT OFFICE 2,565,402

STREPTOMYCIN PREPARATION

Isaiah A. Solomons, III, Garden City, N. Y., assignor to Chas. Pfizer & Co., Inc., Wilmington, Del., a corporation of Delaware No Drawing. Application December 11, 1948, Serial No. 64,911

4 Claims. (Cl. 260—210)

This invention relates to improved streptomycin preparations, and processes for their production.

It is well known that streptomycin is a water-soluble, levo-rotatory, nitrogenous, basic organic material exhibiting therapeutically useful properties. It is elaborated by strains of the microorganism, Streptomyces griseus, in suitable culture media. Streptomycin chemically designated media. Streptomycin chemically designated N-methyl - L-glucosaminido-streptosido-streptidine is obtained from the elaboration products of Streptomyces griseus, by adsorption on charcoal followed by elution with an acidic solvent such as acidified water or methanol. Streptomycin can also be recovered from the culture medium by precipitation of its insoluble azo sulfonic acid dye salts, for example, its salt of Congo red or helianthic acid, and can be recovered from these dye salts by suitable procedures. The crude product thus obtained is a streptomycin acid salt such as streptomycin hydrochloride of relatively low activity or potency. The potency of this antibiotic is determined by biological methods in terms of the inhibition of growth of micro-organisms such as E. coli and B. subtilis in comparison with a standard of known activity (J. Biol. Chem., vol. 153, p. 249 (1944); J. Bact., vol. 47, p. 199 (1944)). The potency or activity may also be determined chemically by measuring the amount of maltol formed upon alkaline hydrolysis of streptomycin under specified conditions and compared with a standard, or by testing for the guanidine grouping in the streptidine moiety of the molecule.

The crude streptomycin salt can be further purified by chromatography from methanol or aqueous methanol on an acid washed alumina column (J. Biol. Chem., vol 160, p. 337 (1945)). It may also be further purified by preparation and recrystallization of the reineckate, reineckate sulfate or helianthate. The streptomycin obtained by the subsequent conversion of these compounds to the desired mineral acid salt is a substantially pure material. This relatively pure streptomycin has been further characterized as the streptomycin trihydrochloride-calcium chloride double salt, by adding the calculated amount of calcium chloride to a methanolic solution of the hydrochloride and diminishing the volume of the solvent until crystallization occurs (J. A. C. S., vol. 67, p. 1866 (1945)).

Samples of streptomycin prepared by prior art methods, including those described above, contain varying amounts of a toxic constituent closely related to streptomycin in structure and of such nature that the optimal dose required from the antibiotic standpoint might be hazardous to use. This toxic constituent is so similar to streptomycin from the chemical standpoint that it is designated as "pseudo-streptomycin." Despite the chemical similarity between these two compounds, pseudo-streptomycin has very low antibiotic efficiency and is extremely toxic. The degree of toxicity imparted to streptomycin preparations by this pseudo-streptomycin is quite variable since the amount present varies widely, and is largely independent of the potency of the preparation. Thus, both high and low potency streptomycin preparations can have low subcutaneous or intravenous toxicities, and even the purest materials available may vary considerably in their toxicities. (Annals N. Y. Acad. Sciences, vol. XLVIII, art. 2, page 101 (1946).)

The intravenous toxicity of streptomycin is tested according to the U. S. Food and Drug Administration as follows:

Inject intravenously each of five mice, within the weight range of 18 to 25 grams with 0.5 ml. of a solution containing 2 mg./ml. of streptomycin. The injection should be made over a period of not more than 5 seconds. If no animal dies, within 48 hours, the sample is non-toxic. If one or more animals dies within 48 hours, repeat the test with five unused mice weighing 20 grams ($\pm 0.5$ gm.) each; if all animals survive the repeat test, the sample is non-toxic. (Federal Register and Code of Regulations. Title 21, Part 1, Section 141.)

In this test, the term $LD_0$ is used to denote the maximum number of micrograms of streptomycin (in terms of free base) that can be injected into a selected number of 20 gm. mice and cause no deaths.

It is an object of this invention to prepare streptomycin of reduced toxicity and increased biological potency. A further object is to convert pseudo-streptomycin to streptomycin at various stages in the manufacturing processes. Further objects will appear hereinafter.

I have found that pseudo-streptomycin may be converted readily to streptomycin. In accordance with my invention, this conversion is effected by the action of hydrogen ions upon an aqueous solution of the pseudo-streptomycin. This material will withdraw hydrogen ions from solution until it is completely converted to the desirable streptomycin. Hence, the end-point in my conversion process may be determined when the hydrogen ion concentration of the solution ceases to drop, and achieves a substantially constant level. A high hydrogen ion concentration, and also heat, accelerate this conversion. These accelerating factors, however, must be employed with caution to avoid decomposition of streptomycin. For instance, at a pH of 1 and a temperature of 75° C. more streptomycin may be decomposed than is produced by the conversion of pseudo-streptomycin.

I prefer to effect my conversions in aqueous solutions having a pH of 2 to 4, maintained at temperatures up to 75° C. As the pH of the solution selected is reduced within this range the temperature should also be reduced to avoid undue decomposition of streptomycin. At a pH of 4, a temperature of about 75° C. may be maintained; but at a pH of 2.5 to 3, a temperature of about 50° C. is preferred.

The pH of the solution may be adjusted by the addition of acids such as hydrochloric, sulfuric, citric, sulfonic, phosphoric, or other acids having the desired degree of dissociation and no detrimental effect upon the streptomycin in solution. As a general rule, it is desirable to add acid to the solution to maintain a constant pH as the conversion reaction uses up acid.

I have found that by means of my invention the $LD_0$ of certain streptomycin preparations can be increased by as much as 100%, and in selected samples in which the toxic material has been concentrated, the $LD_0$ can be increased by as much as one hundred-fold. This desirable result can be achieved not only with partially purified streptomycin, but also with the purest streptomycin obtainable by known procedures.

Pseudo-streptomycin may be concentrated and isolated in the following manner: Streptomycin trihydrochloride is dissolved in 90% methanol-10% water, and to this is added about 10% of the quantity of triethylamine sulfate in methanol calculated to completely precipitate all the streptomycin as the methanol-insoluble streptomycin sulfate. A streptomycin fraction greatly enriched in the toxic pseudo-streptomycin is obtained in the precipitate, which when converted to the trihydrochloride and extracted with methanol leaves a residue that is highly toxic. This material can be further purified by crystallizing it from water as the reineckate then recrystallizing the salt obtained. The relatively pure material can be obtained by dissolving its reineckate in methanol, and precipitating the sulfate of the pseudo-streptomycin. The colorless product so obtained has the following properties:

B. subtilis potency ---------------- γ/mg-- 80
Maltol potency------------------ γ/mg-- 200
Streptidine potency-------------- γ/mg-- 740
$LD_0$ ----------------------------------γ-- 12.5 and appears to be a condensation product of two molecules of streptomycin linked at their carbonyl groups by an amine bridge. The formula appears to be:

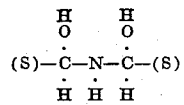

where (S) is the streptomycin molecule less a —CHO group which it normally contains.

Purified streptomycin sulfate assays about 800 γ/mg. by B. subtilis, maltol, and streptidine analyses.

The psuedo-streptomycin does not take up hydrogen when subjected to catalytic hydrogenation under atmospheric pressure in contrast to streptomycin which takes up 1 mole of hydrogen under the same conditions. This is one of the few distinguishing characteristics between streptomycin and pseudo-streptomycin.

When the concentrate of toxic pseudo-streptomycin sulfate is dissolved in water under acid conditions, it is converted, with the consumption of one equivalent of acid per 1400–1500 grams, to streptomycin sulfate assaying 700 γ/mg. maltol and B. subtilis, and with an $LD_0$ of at least 1250 γ. Although the reaction proceeds smoothly and to completion at room temperature, it is preferred to maintain the solution at about 50° C. and the pH at about 2.5 in order to speed the conversion.

The reaction can also be performed on the initial psuedo-streptomycin sulfate fraction obtained as previously described. This toxic fraction ($LD_0$ 100 γ-B. subtilis 360 γ/mg.) is dissolved in water at the desired concentration and adjusted with sulfuric acid to pH 2.5. The solution is maintained at approximately 50° C. for two hours, and periodically readjusted back to pH 2.5 with sulfuric acid. At the end of the heating period, the solution is adjusted to pH 5.5 with barium hydroxide, and the barium sulfate produced is removed by filtration. The streptomycin, recovered from the filtrate by any of several well known methods, has an $LD_0$ of 1000 and a biological potency of 630 γ/mg. (B. substilis).

I have found that it is not necessary to concentrate the toxic pseudo-streptomycin in order to practice my invention. Thus, it is possible to treat the entire lot of streptomycin without separation of any pseudo-streptomycin, under conditions similar to those described above, and thereby lower the toxicity substantially. Thus, streptomycin trihydrochloride-calcium chloride double salt is dissolved in 50% methanol-50% water, and the calcium is removed as calcium sulfate by precipitation with the calculated amount of triethylamine sulfate in methanol. The resulting filtrate is then adjusted with sulfuric acid to pH 2.5 and heated at 50° C. for two hours. The solution is maintained at approximately pH 2.5 throughout the heating period by the periodic addition of sulfuric acid. After the conversion is completed, the solution is cooled, and adjusted to pH 5.5 by the addition of triethylamine. The streptomycin sulfate is then precipitated with triethylamine sulfate in methanol, and dried. The product so obtained has an $LD_0$ of 1750γ. The product obtained from the same source, but without utilizing this invention in the process has an $LD_0$ of 750γ.

The foregoing procedures are described in more detail in the following illustrative examples.

*Example 1*

2.0 grams of the isolated pseudo-streptomycin, as sulfate, having a B. subtilis potency of 96 γ/mg., maltol 200 γ/mg., and a toxicity of $LD_0$ 13γ, obtainable as previously described, is dissolved in 20 ml. of water. Dilute sulfuric acid is added to pH 2.5, and the solution is heated to 50° C. The pH of the solution is periodically checked, and maintained at pH 2.5 by the addition of dilute sulfuric acid, since the conversion of the toxic pseudo-streptomycin to low toxicity streptomycin consumes acid. The heating is continued until the pH remains constant for fifteen minutes, then the solution is cooled and neutralized with barium hydroxide to pH 5.5. The precipitated barium sulfate is filtered, and the streptomycin sulfate is recovered from the filtrate by freeze-drying. The product, primarily streptomycin sulfate, has a B. subtilis potency of 670 γ/mg., maltol 690 γ/mg. and a toxicity of LD₀ 1250γ.

Example 2

1.5 grams of isolated pseudo-streptomycin, as sulfate, having a B. subtilis potency of 96 γ/mg., maltol 200 γ/mg., and a toxicity of LD₀ 13γ, obtainable as previously described, is dissolved in 20 ml. of water, and the solution is adjusted to pH 2.5 with hydrochloric acid. The solution is stored at 25° C. for four days, during which time it is adjusted to pH 2.5 daily with hydrochloric acid. After this period of time there is no further change in pH. The solution is then neutralized with silver oxide to pH 5.5, the silver chloride is filtered, and the filtrate is freeze-dried. The dried streptomycin sulfate had a B. subtilis potency of 660 γ/mg., a maltol potency of 650 γ/mg. and an LD₀ of 1250 γ/mg.

Example 3

80 grams of pseudo-streptomycin sulfate concentrated and isolated by fractionation, as previously described, is dissolved in 1000 ml. of water and divided into four portions, which are adjusted respectively with sulfuric acid to pH 1.5, pH 2.0, pH 2.5, and pH 4.0. These solutions are stored at 25° C., and adjusted back to their initial pH with sulfuric acid daily. After five days, they are adjusted to pH 5.5 with barium hydroxide, filtered, and dried. The properties of these products as well as the starting material are tabulated below.

|  | Original | pH 1.5 | pH 2.0 | pH 2.5 | pH 4.0 |
|---|---|---|---|---|---|
| Maltol (γ/mg.) | 375 | 425 | 600 | 640 | 640 |
| Streptidine (γ/mg.) | 760 | 700 | 745 | 760 | 759 |
| B. subtilis (γ/mg.) | 280 | 430 | 440 | 595 | 605 |
| E. coli (γ/mg.) | 340 | 430 | 460 | 585 | 590 |
| LD₀ (γ) | 75 | 1,000 | 1,000 | 750 | 750 |

The relatively smaller increase in potency at pH 1.5 and pH 2.0 is due to streptomycin decomposition in these acid solutions.

Example 4

(a) Streptomycin trihydrochloride - calcium chloride double salt (5 grams) containing pseudo-streptomycin trihydrochloride-calcium chloride double salt and having a B. subtilis potency of 620 γ/mg. is dissolved in 30 ml. of 50% water-50% methanol, and the calcium is removed as calcium sulfate by the addition of triethylamine sulfate in methanol. The resulting solution is adjusted to pH 2.5 with dilute sulfuric acid and heated at approximately 50° C. During the heating period, the pH of 2.5 is maintained by the addition of sulfuric acid. After two hours' heating, the solution is cooled, neutralized to pH 5.5 with triethylamine and added to sufficient methanol to make the resulting solution at least 90% methanol. The streptomycin sulfate is completely precipitated with triethylamine sulfate, filtered, and dried to give streptomycin sulfate assaying B. subtilis potency: 750 γ/mg. and with an LD₀ of 1750γ.

(b) The streptomycin trihydrochloride-calcium chloride double salt (5 grams) used in Example 4 (a) is dissolved in 30 ml. of 50% water-50% methanol; the calcium is removed, and the streptomycin precipitated from 90% methanol-10% water with triethylamine sulfate. The streptomycin sulfate when filtered and dried assayed B. subtilis potency: 700 γ/mg. and had a toxicity of LD₀ 750γ.

Example 5

3.0 grams of partially purified streptomycin sulfate (B. subtilis 550 γ/mg.; LD₀ 750γ) containing pseudo-streptomycin sulfate is dissolved in 20 ml. of water. The solution is adjusted to pH 2.5 with sulfuric acid, and then maintained at approximately 50° C. for two hours. It is then cooled, neutralized to pH 5.5 with barium hydroxide, filtered, and dried. The product so obtained has a potency of 600 γ/mg. and a toxicity of LD₀ 1500γ.

I may use aqueous solutions with water alone as the solvent or water in admixture with water-miscible alcohols, e. g. methanol or ethanol in which streptomycin salts are soluble. Methanol alone is also a suitable solvent for the reaction. The pseudo-streptomycin and streptomycin should be present in the form of their water soluble salts so the preparation will dissolve readily in the solution which is to supply the hydrogen ions for the conversion reaction.

As many apparently widely different embodiments of this invention may be made without departing from the spirit and scope hereof, it is to be understood that this invention is not limited to the specific embodiments hereof, except as defined in the appended claims.

What is claimed is:

1. A process for converting pseudo-streptomycin to streptomycin which comprises subjecting it in an aqueous solution to a pH within the range of 2 to 4 and to a temperature not higher than 75° C., periodically checking the pH, adding acid to keep the pH within said ranges and terminating the treatment when a check shows that the pH of the solution has remained substantially constant.

2. A process which comprises acidifying an aqueous solution of a water soluble pseudo-streptomycin salt to a pH within the range of 2 to 4, maintaining the acidified solution at a temperature of approximately 50° C. periodically checking the pH and adding acid until no more acid is consumed, and recovering therefrom the resulting streptomycin.

3. A process which comprises treating a water soluble salt of pseudo-streptomycin in a dilute aqueous acid solution maintained at a pH of approximately 2.5 and a temperature of approximately 50° C. for approximately two hours, and recovering therefrom the resulting streptomycin.

4. A process which comprises treating pseudo-streptomycin hydrochloride in a dilute aqueous acid solution maintained at a pH of approximately 2.5 and a temperature of approximately 50° C. for approximately two hours, then raising the pH of the solution to approximately 5.5 and precipitating, separating and drying a streptomycin salt from the resulting solution.

ISAIAH A. SOLOMONS, III.

REFERENCES CITED

The following references are of record in the file of this patent:

UNITED STATES PATENTS

| Number | Name | Date |
|---|---|---|
| 2,461,922 | Rake et al. | Feb. 15, 1949 |

FOREIGN PATENTS

| Number | Country | Date |
|---|---|---|
| 616,438 | Great Britain | Jan. 21, 1949 |

OTHER REFERENCES

Vander Brook et al.: J. Biol. Chem., v. 165 (1946), pp. 464–465, 2 pages.